March 13, 1962 P. WARGO 3,025,369
SPEED RESPONSIVE DEVICE
Filed Nov. 30, 1959
2 Sheets-Sheet 1

INVENTOR
PETER WARGO
By Boardman S. Mowry
ATTORNEY.

March 13, 1962 P. WARGO 3,025,369
SPEED RESPONSIVE DEVICE
Filed Nov. 30, 1959 2 Sheets-Sheet 2
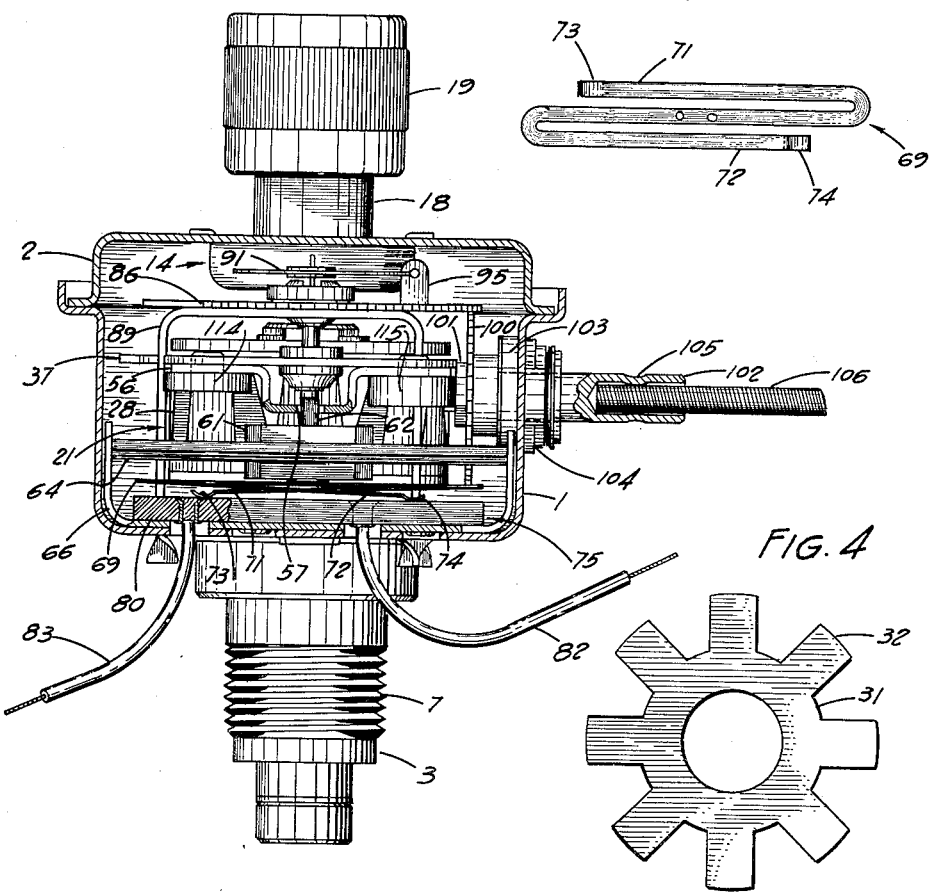
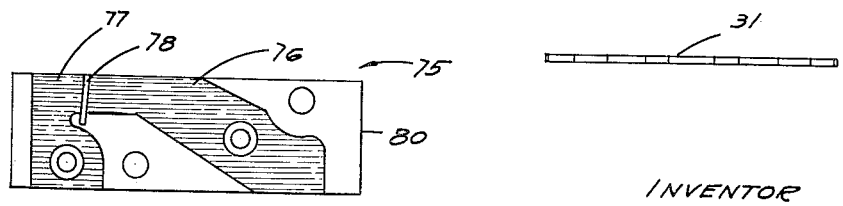
INVENTOR
PETER WARGO

United States Patent Office 3,025,369
Patented Mar. 13, 1962

3,025,369
SPEED RESPONSIVE DEVICE
Peter Wargo, Maywood, Ill., assignor to Stewart-Warner Corporation, Chicago, Ill., a corporation of Virginia
Filed Nov. 30, 1959, Ser. No. 856,088
11 Claims. (Cl. 200—61.46)

This invention pertains to speed responsive devices and especially those in which electrical connections are made or broken.

It is a primary object of the invention to provide a unique speed responsive device of the type employing rotating magnet means and a biased eddy current member which is movable upon the achievement of a predetermined speed of the magnet means.

Another object is to provide a device of the above type which can be used to turn on and off a warning signal or energize the automatic shifting of gears, for instance, and which is connectable between the speedometer takeoff of an automobile and the speedometer, being operated by the speedometer cable which drives through the device.

Another object is to provide such a device which in spite of the drive-through arrangement and the consequent inability to employ the usual eddy current cup or disc rotating about the same axis as the magnet means produces at least as much torque as such conventional eddy current member.

Another object is to provide a lightweight eddy current member having an axis offset to one side of the magnet means and formed so as to multiply the force available for operating purposes.

Another object is to provide a lightweight eddy current member having an axis to one side of the magnet means and formed so as to avoid the hub portion of the magnet means.

Another object is to provide an eddy current member having an axis to one side of the magnet means and formed so as to present a constant area overlapping the magnet means for all operative positions of the member.

Another object is to provide a lightweight eddy current member having an axis offset to one side of the magnet means and formed to extend around the hub portion of the means to the other side thereof for maximum torque, compactness, and economy of the device.

Another object is to provide a drive-through speed responsive device such as above described which can be used with any speedometer.

Another object is to provide such a speed responsive device, usable for operating a warning system for instance, which is independent of the speedometer and which will in no way affect its operation and introduce error as in the case of built-in warning devices.

Another object is to provide an independent speed responsive switch device which can handle much heavier electric current than the built-in devices which can accommodate only very light current.

Another object is to provide an independent speed responsive device usable for operating a warning system which will not be erratic in its operations as a result of reflecting the variations in or irregularity of speed of the magnet means resulting from the use of a flexible speedometer core, as in the case of the prior constructions.

Another object is to provide an independent speed responsive switch device which is subject to very little wear because of arcing, unlike the prior constructions.

Another object is to provide an independent speed responsive switch device in which there are an infinite number of contact breaking points on a switch plate portion used in succession as the next prior point burns and becomes worn as the result of arcing.

Another object is to provide a speed responsive switch device of the type described in which the pressure relied on for the electrical connection between the moving and fixed switch contacts is independent of the action of the magnet means and which is constant. This is important because when the predetermined speed of the magnet means is reached there is barely torque enough to overbalance the resisting spring and allow slight movement of the eddy current member. Upon such slight movement of the latter member, a force balance is set up between the torque created by the magnet means and that provided by the spring and there is no real force available to preserve an electrical contact. As a result where the contact pressure is dependent on the action of the magnet means considerable making and breaking of the contacts, arcing, and alternate operation and nonoperation of any device connected in the electrical circuit is present. The present device gives positive contact at all times and of a value much greater than is possible by the nearly balanced condition of the eddy current member.

Another object is to provide a switch device as above described in which movable contacts slide along a switch plate for the making and breaking of the electrical circuit, the contacts being held in contact with the plate by uniform spring pressure independent of the action of the magnet means.

Another object is to provide a speed responsive switch device having sliding contacts in which very little friction is present. This is made possible in the present device preferably by employing a sliding electrical contact support made of self-lubricating plastic material, such as nylon, sliding along guide rails of square sections turned on edge for line bearing contact with the supporting member.

Another object is to provide a speed responsive switch device of the type described in which the electrical connection is maintained at all speeds above the predetermined speed, unlike the prior art constructions.

Another object is to provide a speed responsive device of the above type in which the predetermined speed at which the device will operate can be easily and conveniently varied and at a remote location, as for instance an automobile control panel Other objects, advantages and features of the invention will appear from the following description taken in conjunction with the accompanying drawings in which:

FIG. 3 is a cross-sectional view taken on line 3—3 of FIG. 2;

FIG. 4 is a top plan view of the magnet compensator member taken separately;

FIG. 5 is an elevational view of the compensator of FIG. 4;

FIG. 6 is a top plan view of the switch plate means, taken separately; and

FIG. 7 is a top plan view of the electrical contact member, taken separately.

Figure 1:
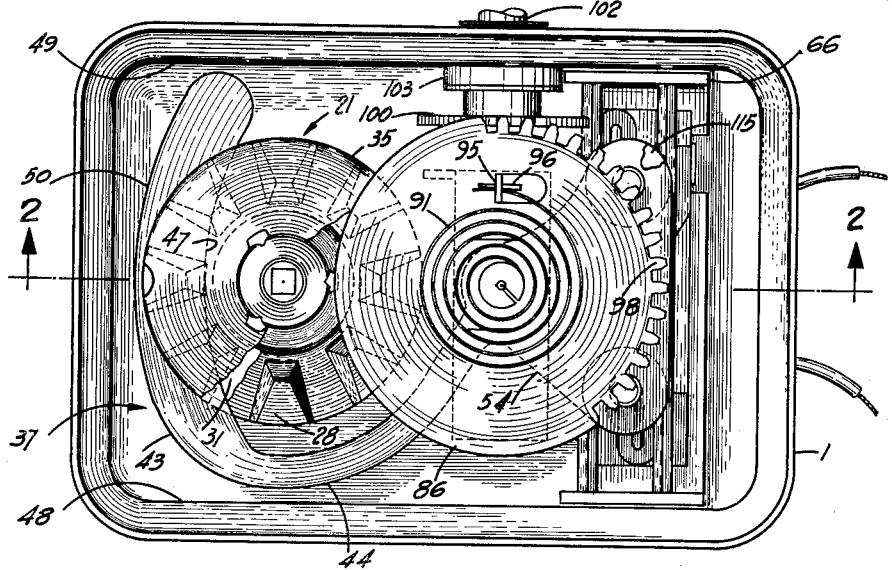
FIG. 1 is a top plan view of a preferred form of the device with the cover removed.
Figure 2:
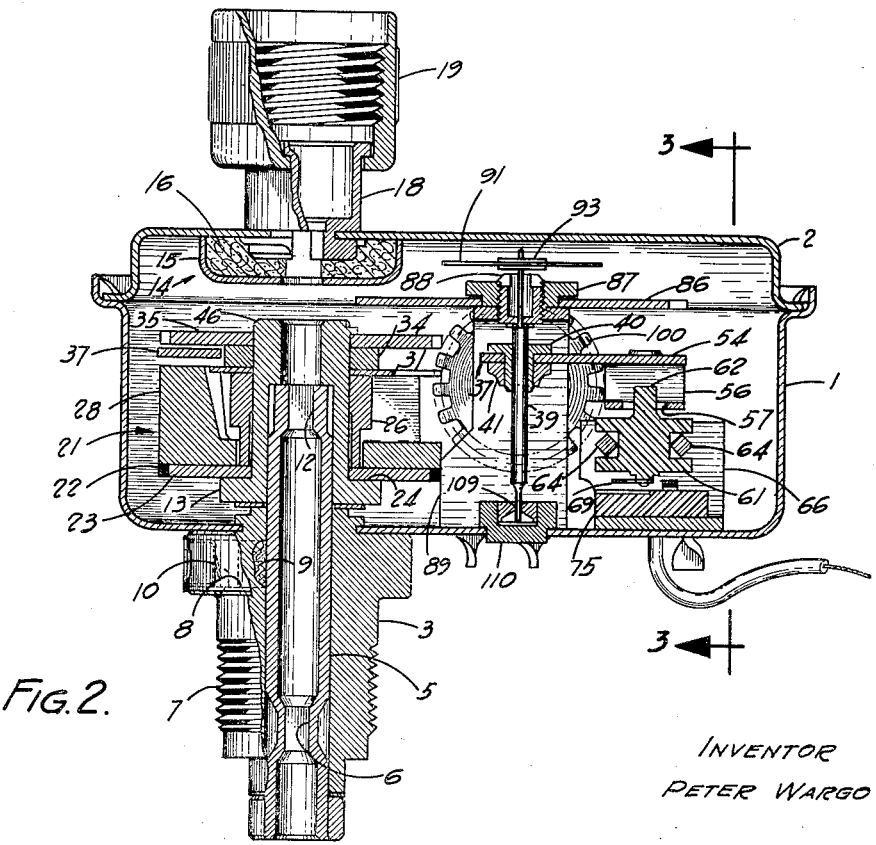
FIG. 2 is a cross-sectional veiw taken on line 2—2 of FIG. 1.

Referring to the drawings in detail, the device has a lower casing portion 1 surmounted by a cover 2. A sleeve 3 is secured to and extends through the bottom of the casing portion 1 and contains a hollow shaft 5. This shaft is of square inner contour at 6 for reception of the square tip of a speedometer cable core (not shown). The outside of the sleeve 3 is threaded at 7 for attachment of the speedometer cable sheathing fitting (also not shown). Lubrication of the shaft 5 is accomplished by means of a cavity 8 containing an oil saturated felt plug 9, the cavity being closed by a cap 10.

The opposite end of shaft 5 is also of square inner contour at 12 for reception of the square tip of a flexible core (not shown) which is extendable from the shaft through the magnet insert member 13, dust shield 14, and the other parts attached to the cover 2 into driving engagement with any suitable speedometer (also not shown).

The dust shield consists of a metal retainer 15 and felt washer 16. Sleeve member 18 is secured to the top of the cover by suitable means such as staking, as shown, this sleeve supporting an internally threaded coupling nut 19 for threaded reception of a conventional speedometer shaft sleeve (not shown).

The magnet insert member 13, previously mentioned, is pressed on the magnet shaft 5 so as to rotate with it. A magnet member 21 is secured, as by an annular weld 22, to a field plate 23. The magnet member, together with the field plate, is supported on shoulder 24 of the insert member 13.

An annular spacer member 26 is received around the insert member 13, being pressed thereon in order to rotate with it. This spacer member tightly abuts the top of the field plate 23 so as to clamp the latter and magnet member to the member 13 for rotation with the shaft 5.

The magnet member 21 has a plurality of spaced upwardly projecting polar elements 28 arranged around the circumference of the member. The upper ends of these portions are magnetized, the polarity of the poles being alternately north and south around the magnet means. A compensator member 31 surmounts the spacer member 26 and has the same number of spaced projecting elements 32 as there are poles on the magnet member. The compensator is positioned so as to allow the projecting portions to extend between the adjacent poles of the magnet member. An additional spacer member 34 is placed on top of the compensator member, above which a field plate 35 is secured to the member 13, as by staking, for rotation with the magnet member.

Eddy current member 37 is positioned in the path of the magnetic flux between the magnet member 21 and field plate 35. The eddy current member is arranged to oscillate about an axis which is spaced from the magnet member and parallel to the axis of the latter. More particularly, the eddy current member is supported at the center of oscillation on a shaft 39 through the intermediate bushing element 40, which is pressed within the member, and the retaining element 41 pressed in turn on the bushing.

The eddy current member is of special, generally hook-like form having an outer arm portion 43 and a portion 44 connecting the outer arm to the center portion of the member adjacent the bushing 40. The outer arm is positioned on the opposite side of the axis of the magnet member from the center of oscillation of the eddy current member and the hook formation allows the eddy current member to extend around the hub portion 46.

The side 47 of the outer arm which faces the magnet means axis is of arcuate form, the center of the arc being coincident with the center of oscillation of the eddy current member. The outer arm also extends beyond the magnet member at each end in all operative positions of the eddy current member between the limiting faces 48 and 49 of the lower casing portion 1. The outer arm also preferably extends outwardly beyond the magnet member on the side away from the edge 47. In the form illustrated, the opposite side 50 is also of arcuate form with the center of the arc coincident with the center of oscillation of the eddy current member. The connecting portion 44 of the member extends from one end of the outer arm 43 in a direction away from the latter arm towards the center of the member. The portion 44 is beyond the path of flux of the magnet means in all operative positions of the member. It is therefore seen that the eddy current member presents a constant area overlapping the magnet member in all of its operative positions, thus presenting a straight-line torque relation for the different speeds of rotation of the magnet member.

An arm portion 54 extends from the eddy current member in a direction away from the outer arm 43. The portion 54 is shown as an integral part and extension of the eddy current member. However, this portion can be a separate member, if desired, mounted for oscillation with the eddy current member on the shaft 39. A bracket 56 is attached to the underside of the arm portion 54 adjacent the outer edge of the latter portion. The bracket is provided with a slot 57, the ends of which constitute spaced abutment surfaces.

A supporting member 61 is provided with an upwardly extending pin element 62 which is received within the slot 57 and between the abutment surfaces noted. The supporting member 61 is positioned for reciprocable sliding motion between a pair of square guide rails 64 which are secured at each end in a bracket member 66. The guide rails are turned on a 45° angle so as to present upper and lower as well as inner edges for line bearing contact with the supporting member 61. This arrangement, of course, reduces the amount of friction between the members. The supporting member 61 is also preferably constructed of plastic, such as for instance nylon, for the purpose of presenting a lightweight moving member and also to provide for self-lubricating low friction engagement with the guide rails 64.

An electrical contact member 69 is attached to the bottom of the supporting member 61 for movement with the latter member. The contact member is preferably constructed of a single long strip of electricity-conducting metal, such as copper, having resilient or spring characteristics. In the form shown, the contact member is of folded formation (see FIG. 7) with outer portions 71 and 72 extending in opposite directions. The terminal portions 73 and 74 are of curved formation across the width of the spring member and resiliently contact switch plate member 75 in all operative positions of the member.

The switch plate member comprises two portions, 76 and 77, of electricity-conducting material. These portions extend adjacent to each other, being separated by a relatively narrow gap 78 (see FIG. 6). Actually the portions 76 and 77 are carried by a supporting body 80 of nonconducting material such as plastic, the portions 76 and 77 extending above the surface of the body. Electrical conductors 82 and 83 are attached to the portions 76 and 77, respectively, by suitable means so that when the contact member 69 is positioned with the terminal portions on opposite sides of the slot 78 an electrical circuit, of which conductors 82 and 83 are a part, is completed.

The slot 78 has straight parallel sides and is on a slight angle with respect to a line normal to the straight line reciprocable movement of the contact member 69 and its supporting member. The slight angle provides for optimum operation of the switch device over an extremely long life span of the electrical parts. In explanation, every time a contact member is removed from the circuit making position arcing occurs which burns away a small amount of material from the contact members. By having the edge of the switch plate portion 77 along a straight line which is at a slight angle relative to a line normal to the contact member movement, an infinite number of successive points is provided for breaking contact with the terminal portion 73 when the latter moves to the left as seen in FIG. 3 and 6. As one very small portion of material becomes worn as a result of burning, another portion is available along the edge immediately adjacent to the burned portion for the breaking of contact. In this way an infinite number of small areas are available for a clean break or cutting off of the electrical current as the terminal portion is moved away from the plate portion 77, and a gap width of the original size is always present over a portion of the gap 78 for smooth movement of the terminal portion 73 back and forth across the gap. A gap which is normal to the movement of the contact member widens all along the same so as to interfere with the smooth movement of the terminal portion across the gap and allow sticking and excessive wear, producing rough movement and erratic or improper operation of the device.

A gear member 86 is also mounted on the eddy current member shaft 39 so as to be rotatable relative thereto. This mounting is effected by an internally threaded bushing 87 about which the gear is rotatable and an externally threaded bearing member 88 received within the member 87 and a supporting bracket 89. The member 88 gives bearing support to an upper reduced portion of the shaft 39.

A helical spring 91 is mounted on the upper end of the reduced portion of the shaft 39, the spring being relatively nonrotatably secured to the shaft by means of a collet 93. The outer end of the spring is secured to an upturned ear 95 of the gear 86, being secured in a hole through the ear by means of a tapered pin 96. The gear is provided with a plurality of teeth 98 around a substantial portion of its periphery. A second gear member 100 engages the teeth 98, the axis of the latter gear member being normal to the gear 86. Gear 100 is mounted for rotation on a shaft 102 by suitable means as by staking at 101. The shaft extends through the side of the casing, being held in position by a bearing element 103 staked at 104 for securement to the casing. The shaft is of square inner contour at 105 for reception of the square tip of a flexible cable core 106.

The lower part of the shaft 39 is supported by bearing 109 received in a retaining member 110 suitably attached to the bottom of the casing.

A pair of counterweights 114 and 115 are mounted on the arm portion 54 extending from the eddy current member. This is accomplished by press fitting hub portions into holes in the arm portion. The eddy current member and portion 54 are so formed that with the weights the assembly balances in all directions about the shaft 39.

Considering the magnet member 21, the external flux field passes from one pole upwardly through the hook-shaped eddy current member into the field plate 35 and downwardly through the eddy current member to an adjacent pole of opposite polarity. When the magnet member is rotated in a clockwise direction as seen in FIG. 1 to cause this flux field to move in the eddy current member, eddy currents are produced in the latter member which coact in a well known manner to produce a torque on the same. This torque will tend to rotate the eddy current member on its axis. This torque will have a value which is a direct function of the speed of the magnet means.

Considering the operation of the device, the magnet member 21 is rotated in a clockwise direction, as seen in FIG. 1. The spring member 91 produces a counterclockwise torque (as seen in FIG. 1) on the eddy current member through its connection with shaft 39 normally retaining the member against the casing at 48. Upon the magnet member reaching a predetermined speed of rotation, the eddy current member 37 is moved away from its initial case contacting position a substantial extent in opposition to the spring, thus to move the arm portion 54, supporting member 61, and contact spring 69 towards the left, as seen in FIGS. 3 and 6. Achievement of the predetermined speed will move the terminal portion 73 of the contact spring sufficiently to at least bridge the gap 78 of the switch plate so as to provide an electrical connection between the switch plate portions 76 and 77 and close the circuit previously mentioned. A magnet speed slightly in excess of that causing the bridging engagement of the terminal portion 73 will move the latter portion entirely across the gap 78. Terminal portion 74 remains on switch plate portion 76 in all positions of the contact spring.

When the magnet speed decreases a given amount below the predetermined speed, the supporting member 61 and contact spring are moved in the opposite direction or to the right as seen in FIGS. 3 and 6 so as to move the contact portion 73 across the gap 78 and break the circuit.

Slot 57 allows a certain lost motion to take place between the movement of the eddy current member and arm 54 and that of the supporting member 61 and contact spring. This lost motion connection allows the usual pulsating movement of the magnet member resulting from whipping of the flexible core because of the bent disposition of the same to take place without the pulsations or nonuniformity being carried to the contact spring 69. Continual increase in the speed of the magnet member beyond the predetermined speed will therefore result in movement of the supporting member 61 and carried spring member into the circuit making position without reflecting the pulsations and smaller changes in speed. As a result destructive arcing will be greatly reduced and the objectionable flickering of an alarm signal for instance eliminated. This is because once terminal portion 73 makes contact with switch plate portion 77 the contact is preserved until there is a substantial decrease in the magnet speed. The clearance between the pin 62 and the end of the slot 57 will, therefore, have to be taken up during a decrease in speed of the magnet means before the contact spring will be moved to the right, as seen in FIGS. 3 and 6.

It is further pointed out that the pressure for retaining the electrical contacts 73 and 74 in engagement with the switch plate means is constant and always amply firm for proper electrical connection inasmuch as it resides in the contact spring itself and does not depend on the speed of rotation of the magnet member. This construction also greatly reduces the amount of arcing every time the circuit is broken because once the contact is made with switch plate portion 77 it is preserved until there is substantial decrease in speed of the magnet member. The condition of the prior arrangements where the nearly balanced condition of the eddy current member is insufficient for the making of a good electrical contact and which is productive of a multitude of slight contacts and withdrawals is eliminated.

The present device also provides for varying the predetermined speed at which the contact spring 69 is moved from its initial position in sole contact with plate portion 76 into engagement with the portion 77. The varying of this predetermined speed is brought about by rotation of the flexible core 106 so as to turn the gears 100 and 86 in one direction or the other which in turn moves the end of the spring 91 changing the tension thereof. The core 106 is attached to a knob mounted on the dash or instrument panel of an automobile adjacent a scale marked in miles per hour (all but the core not shown). The device is arranged so as to allow setting of the spring tension for a predetermined magnet speed corresponding to any vehicle speed within a range of from 20 miles an hour to 90 miles an hour. This setting will be maintained permanently until changed by an operator. It will of course be appreciated that adjustment of the spring 91 so as to increase or decrease the stored up energy in turn increases the torque which the eddy current member 21 must overcome before movement of the member will occur. In order for the member to move away from its contact with the casing, the energy of the spring must be balanced and at least slightly overcome together with any inherent friction in the mechanical linkage. One of the features of the present device is that such friction is very low because of lightweight construction, reduced bearing contact, and self-lubricating bearing engagement. The spring contact 69 is slso sufficient for firm electrical engagement without producing undue friction or drag.

It is also important to point out that because of the reliance on the positive spring pressure of the contact member 69 for making the electrical connection rather than the speed of the magnet member, which produces nearly a balanced condition of the eddy current member when movement occurs, the present switch device is able to handle many times heavier current than is possible with devices heretofore known.

Although the device has been illustrated in the drawings in a particular position the device may be used in any position and, accordingly, terms such as "bottom," "above," and "surmounted" are not to be taken in a restricted sense but merely as being relative to the position of the device as shown.

Although in the preferred embodiment the area of the eddy current member 37 overlapping the magnet member is maintained constant in all operating positions, there may be applications in which it is desirable to permit variation in this area as the member is moved.

Although a preferred form of the device and certain uses have been disclosed, it is not desired to be so limited. The invention is accordingly to be limited only by the terms of the appended claims read in the light of the broad spirit thereof.

What is claimed is:

1. A speed responsive device comprising rotatable magnet means having poles movable around the axis of the means and facing in a direction normal to the rotation thereof, an eddy current member oscillatable about an axis substantially parallel to the axis of the magnet means and spaced from the magnet means, the member having an outer arm portion in the path of flux from the magnet means formed so as to have a substantially constant area overlapping the magnet means in all operative positions of the member and a portion out of the path of substantial flux connecting the arm portion to the center of the member, the arm portion extending on both sides of a plane containing the magnet means and eddy current member axes and the connecting portion extending from one end of the arm portion off in another direction towards the center of the member, electrical switch means, means oscillatable with the member and having an abutment portion effective to actuate the switch means, resilient means opposing movement of the member and oscillatable means resulting from rotation of the magnet means and preventing actuation of the switch means until substantial achievement of a predetermined speed of rotation of the magnet means, the distance from the arm portion to the center of oscillation being much greater than that from the center to the abutment portion.

2. A speed responsive device comprising rotatable magnet means having poles movable around the axis of the means and facing in a direction normal to the rotation thereof, an eddy current member with a outer arm portion in the path of flux from the magnet means and on one side of the axis of the latter and a portion out of the path of substantial flux connecting the outer portion to the center of oscillation of the member, the center portion of the member being beyond the magnet means to the other side thereof, the outer portion having a generally arcuate periphery on the side facing the magnet means axis with the center of the arc being coincident with the center of the member, the outer portion extending in a direction away from the arcuate periphery at least even with the outer limit of the path of the rotating poles, the opposite ends of the outer portion extending beyond the outer limit of the path of the poles in all operative positions of the member, electrical switch means, means oscillatable with the member and having an abutment portion effective to actuate the switch means, resilient means opposing movement of the member and oscillatable means resulting from rotation of the magnet means and preventing actuation of the switch means until substantial achievement of a predetermined speed of rotation of the magnet means, the distance from the outer portion to the center of oscillation being much greater than that from the center to the abutment portion.

3. A speed responsive device comprising rotatable magnet means having poles movable around the axis of the means and facing in a direction normal to the rotation thereof, a generally hook-shaped eddy current member having an outer arm portion in the path of flux from the magnet means and on one side of the axis of the latter and a portion out of the path of substantial flux connecting the arm portion to the center of oscillation of the member, the center portion of the member being beyond the magnet means on the side thereof opposite the arm portion, the arm portion having a generally arcuate inner and outer side with the centers of the arcs being coincident with the center of the member, the opposite ends of the arm portion extending beyond the outer limit of the path of the poles in all operative positions of the member, electrical switch means, means oscillatable with the member and having an abutment portion effective to actuate the switch means, resilient means opposing movement of the member and oscillatable means resulting from rotation of the magnet means and preventing actuation of the switch means until substantial achievement of a predetermined speed of rotation of the magnet means, the distance from the arm portion to the center of oscillation being much greater than that from the center to the abutment portion.

4. A speed responsive electrical switch comprising rotatable magnet means having poles movable around the axis of the means, an oscillatable eddy current member adjacent the path of movement of the poles, switch plate means comprising a first and second portion of electricity conducting material slightly spaced from each other, means movable in opposite directions, contact means between the plate means and oppositely movable means and being movable in opposite directions by the latter means, the contact means having two terminal portions resiliently engaging the plate means, the contact means being electrically connected between the terminal portions, the terminal portions being positioned so that one of them is in contact with the first plate means portion at all times while the other terminal portion is slidable from one plate means portion to the other across the dividing space, stationary means retaining the oppositely movable means against movement away from the plate means, means oscillatable with the eddy current member, one of the means oscillatable with the eddy current member and the oppositely movable means having a pair of abutment surfaces facing each other, the other of the means oscillatable with the eddy current member and the oppositely movable means having means projecting between the abutment surfaces effective to move the oppositely movable means and through the same the contact means in opposite directions upon substantial movement of the eddy current member and oscillatable means in opposite directions, the space between the abutment surfaces being greater than the size of the means therebetween providing for lost motion, resilient means opposing movement of the member and oscillatable means resulting from rotation of the magnet means and preventing movement of said other terminal portion into contact with the second plate means portion until substantial achievement of a predetermined speed of rotation of the magnet means, the resilient means being effective to move said other terminal portion out of contact with the second plate means portion upon a predetermined decrease in speed of the magnet means below the predetermined speed.

5. The subject matter of claim 4 in which at least the second plate means portion terminates along a straight line where said other terminal portion is slidable from one plate means portion to the other, the straight line being at an angle relative to a line normal to the movement of said other terminal portion at the moment the terminal portion breaks contact with the second plate means portion, the portion of said other terminal portion actually engaging the plate means having lateral extent and being formed so as to lose contact with the second plate means portion along a straight line of the terminal portion as the terminal portion is moved out of engagement with the second plate means portion, the latter straight line being normal to the movement of said other terminal portion at the moment the terminal portion breaks contact with the second plate means portion.

6. A speed responsive electrical switch comprising rotatable magnet means having poles movable around the axis of the means, an oscillatable eddy current member adjacent the path of movement of the poles, switch plate means comprising a first and second portion of electricity-conducting material slightly spaced from each other, a member movable in opposite directions, a long spring member of electricity-conducting material between the plate means and oppositely movable member and retained at the center portion for movement with the latter, the spring member having a terminal portion at each end thereof resiliently engaging the plate means, the terminal portions being positioned so that one of them is in contact with the first plate means portion at all times while the other terminal portion is slidable from one plate means portion to the other across the dividing space, a stationary guide means retaining the oppositely movable member against movement away from the plate means and along which the oppositely movable member slides, one of the oppositely movable member and guide means being constructed of a plastic material for low friction and self-lubricating engagement, means oscillatable with the eddy current member, one of the means oscillatable with the eddy current member and the oppositely movable member having a pair of abutment surfaces facing each other, the other of the means oscillatable with the eddy current member and the oppositely movable member having means projecting between the abutment surfaces effective to move the oppositely movable member and through it the spring member in opposite directions upon substantial movement of the eddy current member and oscillatable means in opposite directions, the space between the abutment surfaces being greater than the size of the means therebetween providing for lost motion, resilient means opposing movement of the member and oscillatable means resulting from rotation of the magnet means and preventing movement of said other terminal portion into contact with the second plate means portion until substantial achievement of the predetermined speed of rotation of the magnet means, the resilient means being effective to move said other terminal portion out of contact with the second plate means portion upon a predetermined decrease of speed of the magnet means below the predetermined speed.

7. A speed responsive device comprising rotatable magnet means having poles movable around the axis of the means and facing in a direction normal to the rotation thereof, an eddy current member oscillatable about an axis substantially parallel to the axis of the magnet means and spaced from the magnet means, the member having an outer portion in the path of flux from the magnet means formed and disposed so as to have a substantially constant area overlapping the magnet means in all operative positions of the member and a portion out of the path of substantial flux connecting the outer portion to the center of the member, switch plate means comprising a first and second portion of electricity-conducting material slightly spaced from each other, means movable in opposite directions, contact means between the plate means and opposite movable means and being movable in opposite directions by the latter means, the contact means having two terminal portions resiliently engaging the plate means, the contact means being electrically connected between the terminal portions, the terminal portions being positioned so that one of them is in contact with the first plate means portion at all times while the other terminal portion is slidable from one plate means portion to the other across the dividing space, stationary means retaining the oppositely movable means against movement away from the plate means, means oscillatable with the eddy current member, one of the means oscillatable with the eddy current member and the oppositely movable means having a pair of abutment surfaces facing each other, the other of the means oscillatable with the eddy current member and the oppositely movable means having means projecting between the abutment surfaces effective to move the oppositely movable means and through the same the contact means in opposite directions upon substantial movement of the eddy current member and oscillatable means in opposite directions, the space between the abutment surfaces being greater than the size of the means therebetween providing for lost motion, resilient means opposing movement of the member and oscillatable means resulting from rotation of the magnet means and preventing movement of said other terminal portion into contact with the second plate means portion until substanial achievement of a predetermined speed of rotation of the magnet means, the resilient means being effective to move the said other terminal portion out of contact with the second plate means portion upon a predetermined decrease in speed of the magnet means below the predetermined speed, the distance from the outer portion of the members to the axis thereof being much greater than that from the axis to the abutment surfaces and means projecting therebetween.

8. A speed responsive device comprising rotatable magnet means having poles movable about the rotational axis of the means, an eddy current member oscillatable about a pivotal axis substantially parallel to the rotational axis of the magnet means, the member being hook-shaped to have an interconnecting portion extending transversely of the pivotal axis and an outer portion extending transversely of the interconnecting portion, with the outer portion being in the path of the flux from the magnet poles on the side of the rotational axis remote of the pivotal axis and formed and disposed to have a substantially constant area overlapping the magnet poles in all operative positions of the member, while the interconnecting portion is out of the path of substantial flux from the magnet poles in all operative positions, electrical switch means actuated by the member, and resilient means opposing movement of the member resulting from rotation of the magnet means and preventing actuation of the switch means until substantial achievement of a predetermined speed of rotation of the magnet means.

9. A speed responsive device comprising rotatable magnet means having poles movable around the rotational axis of the means, an eddy current member disposed adjacent the poles in the path of flux therefrom and movable responsive to rotation of the magnet means, electrical switch means having a switch plate and a switch member including terminals resiliently engaging the switch plate, means mechanically interconnecting the eddy current member and the switch means to actuate the latter upon movement of the former, and resilient means opposing movement of the eddy current member resulting from rotation of the magnet means and preventing actuation of the switch means until substantial achievement of a predetermined speed of rotation of the magnet means.

10. A speed responsive electrical switch comprising rotatable magnet means having poles movable around the rotational axis of the means, an eddy current member oscillatable adjacent the pitch of movement of the poles, electrical switch means including a switch plate having first and second portions of electricity conducting material slightly spaced and insulated from each other, switch contact means resiliently slidably engaging the switch plate and actuated by the eddy current member to an operate position to interconnect electrically the first and second plate means portions, and resilient means opposing movement of the eddy current member resulting from rotation of the magnet means so that the switch means are actuated to the operate position only upon substantial achievement of a predetermined speed of rotation of the magnet means.

11. In a speed responsive device having a member movable along a given path response to measured speed and mechanically associated with electrical switch means to actuate the switch means at a predetermined speed, and means for adjusting the responsiveness of the member to adjust the actuating speed, an improved electrical switch means comprising resilient electrical conductive means operaitvely secured to the movable member and having spaced terminals, switch plate means having aligned first and second electroconductive portions spaced from one another, and means to support the switch plate means adjacent the resilient means so that both terminals engage the first portion when the member is at one endward portion of its path, while only one of the terminals engages the first portion and the other of the terminals engages the second portion when the member is at the opposite endward portion of its path, to interconnect electrically the portions.

References Cited in the file of this patent
UNITED STATES PATENTS
2,920,154  Allen ------------------ Jan. 5, 1960

UNITED STATES PATENT OFFICE
CERTIFICATE OF CORRECTION

Patent No. 3,025,369                      March 13, 1962

Peter Wargo

It is hereby certified that error appears in the above numbered patent requiring correction and that the said Letters Patent should read as corrected below.

Column 10, line 67, for "pitch" read -- path --; column 11, line 6, for "response" read -- responsive --; line 12, for "operaitvely" read -- operatively --.

Signed and sealed this 3rd day of July 1962.

(SEAL)
Attest:

ERNEST W. SWIDER
Attesting Officer

DAVID L. LADD
Commissioner of Patents